United States Patent [19]

Sihon

[11] Patent Number: 5,428,895
[45] Date of Patent: Jul. 4, 1995

[54] METHOD OF MANUFACTURING SEALING GASKET WITH HARD INTERIOR BACKBONE AND INTEGRAL CRUSH LIMITERS

[75] Inventor: Tanas M. Sihon, Monroe, Mich.

[73] Assignee: Chrysler Corporation, Highland Park, Mich.

[21] Appl. No.: 269,507

[22] Filed: Jul. 1, 1994

Related U.S. Application Data

[62] Division of Ser. No. 976,096, Nov. 13, 1992, Pat. No. 5,364,109.

[51] Int. Cl.⁶ .......................... B23P 15/00; F16J 15/06
[52] U.S. Cl. .................................................. 29/888.3
[58] Field of Search .................... 29/888.3; 277/9, 180, 277/233, 235 B

[56] References Cited

U.S. PATENT DOCUMENTS

| | | | |
|---|---|---|---|
| 3,053,544 | 9/1962 | Gorsica | 277/180 |
| 3,231,288 | 1/1966 | Hensien | 277/180 X |
| 4,196,913 | 4/1980 | Oka | 277/235 B |
| 4,813,691 | 3/1989 | Schoenborn | 277/235 B |
| 4,867,461 | 9/1989 | Shimmell | 277/180 X |
| 5,080,379 | 1/1992 | Zimmerman et al. | 277/235 B X |
| 5,118,121 | 6/1992 | Hellman, Sr. | 277/180 X |
| 5,131,668 | 7/1992 | Uchida | 277/180 X |
| 5,193,822 | 3/1993 | Bonell et al. | 277/180 |
| 5,272,808 | 12/1993 | Udagawa et al. | 29/888.3 |
| 5,294,135 | 3/1994 | Kubouchi et al. | 29/888.3 |

FOREIGN PATENT DOCUMENTS

| | | | |
|---|---|---|---|
| 3831413 | 4/1990 | Germany | 277/235 B |
| 836584 | 6/1960 | United Kingdom | 277/235 B |

Primary Examiner—William A. Cuchlinski, Jr.
Assistant Examiner—Scott W. Cummings
Attorney, Agent, or Firm—Kenneth H. MacLean

[57] ABSTRACT

A gasket for sealing the connection between a cylinder head and a valve cover. The gasket has a sheet metal backbone having a main body with spaced stations having holes therethrough for cap screws fastening a valve cover to a cylinder head. A finger-like tab extends inwardly from the stations. Each tab has a cap screw hole at the distal end thereof, The tabs are bent back over the main body so as to be in contact with the spaced stations and with the holes in the tabs and stations in alignment. The backbone has a rubber based material subsequently molded therearound. The result of the folded construction is a double thickness of metal in the areas surrounding the cap screw holes to form positive stops to limit the compression loads applied to the rubber based seal of the gasket by the cap screws when the valve cover is fastened to the cylinder head. The compression loads are thereby limited and the gasket is protected from damage by excessive loads so that effective sealing and long service life is assured.

1 Claim, 2 Drawing Sheets

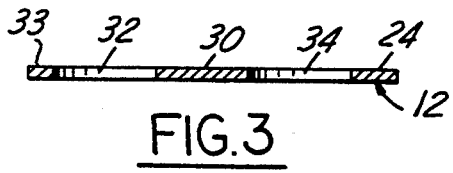
FIG.3
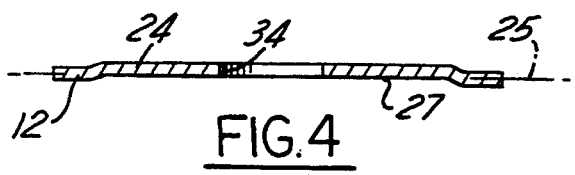
FIG.4
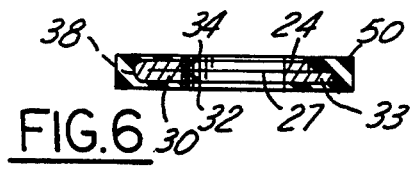
FIG.6
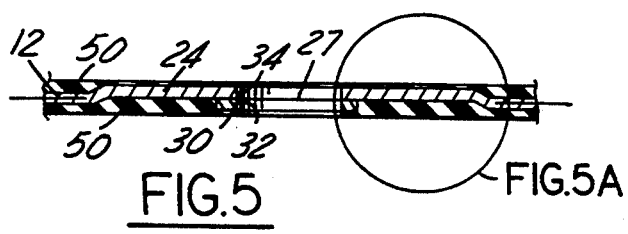
FIG.5
FIG.5A
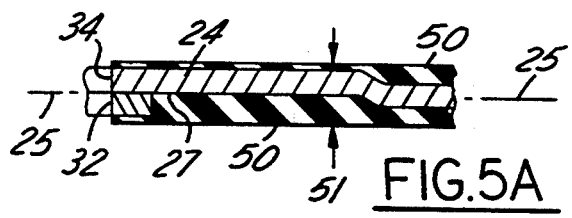
FIG.5A
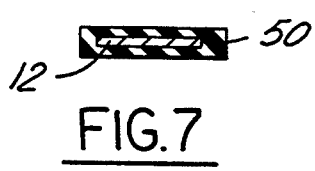
FIG.7
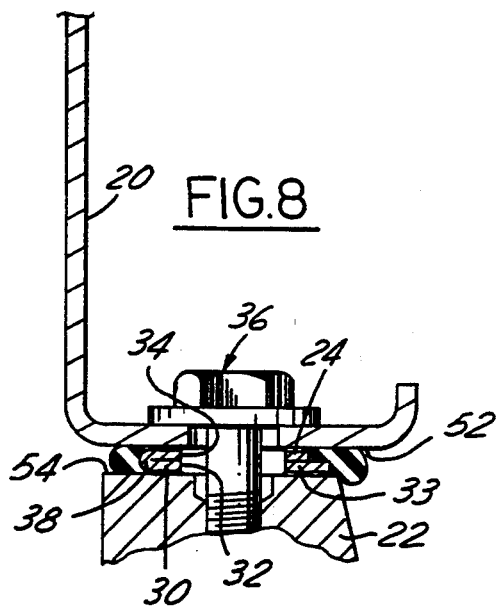
FIG.8
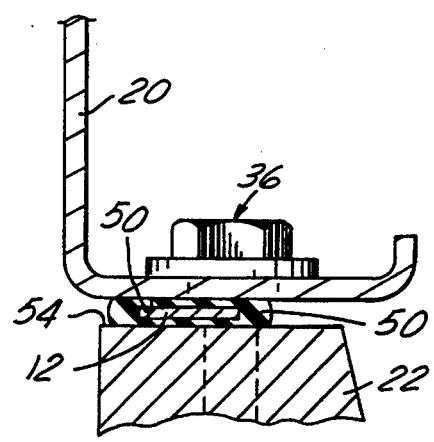
FIG.9

METHOD OF MANUFACTURING SEALING GASKET WITH HARD INTERIOR BACKBONE AND INTEGRAL CRUSH LIMITERS

CROSS-REFERENCES TO RELATED APPLICATIONS

This application is a division of pending application Ser. No. 07/976,096, filed Nov. 13, 1992 now U.S. Pat. No. 5,364,109, by the same inventor as in the present application.

FIELD OF THE INVENTION

This invention relates to seals, and more particularly, to sealing gaskets having a sealing material surrounding hard interior backbone with integral compression limiting structure. This invention also relates to a new and improved method of making a sealing gasket.

DESCRIPTION OF RELATED ART

Prior to the present invention, various gasket constructions have been engineered with stop mechanisms to eliminate excessive loads when the gasket is interposed between two members rigidly secured to one another by fasteners such as cap screws. Such stops limit the compressive loading of the gasket so that it is not distorted or damaged resulting in leaks of fluid, or other matter, after the parts have been joined together. Examples of such construction are U.S. Pat. No. 2,739,001 to Chiles Jr. for GASKETS WITH STOPS THEREIN, and U.S. Pat. No. 4,655,463 to Inciong et al. for GASKET ASSEMBLY FOR OIL PAN VALVE COVERS AND THE LIKE.

SUMMARY OF THE INVENTION

The present invention is of the general nature of the prior patents identified above, but further incorporates compression limiters integral with the backbone element of the gasket that is encased in a fluid sealing material. More particularly, the present invention is exemplified by a gasket assembly comprising a generally flat backbone of sheet metal material that has a main body generally rectangular with rounded corners to define particular sized openings in connections of construction which are to be sealed in a fluid tight manner.

The main body has integral finger-like tabs that extend from predetermined stations in the wall of the main body into the opening defined thereby. The distal end portion of each of the tabs has a circular hole punched, or otherwise formed therein, so that when each of the tabs is reversely folded to contact and lay atop the flattened wall portion of the main body, the hole therein aligns with a corresponding hole in the wall portion of the main body.

By this arrangement, a double thickness of metal is provided with an opening therethrough that has a depth equal to a double thickness of the backbone. The surrounding material defining the fastener holes in the backbone forms a compression limiter construction.

After the core has been formed with the tabs folded, as described, a rubber compound or a thermoplastic elastomer or other suitable sealing material is molded or otherwise formed around the core so that the gasket has a substantially uniform thickness with built-in stops to limit gasket "crush" or compression loads, when the gasket is interposed between two components that are to be joined by threaded fasteners with effective fluid sealing therebetween. More particularly, this effectively eliminates, or reduces, cold flow of the sealing material from the sealing area and prevents damage thereto, and ensures that the gasket is equally loaded throughout the extent thereof and has long service life. The gasket assembly can be of any configuration to match the particular installation required. The fastener holes are aligned to support and guide the threaded fasteners into the threadedly tapped holes in the cylinder head.

The invention further provides a new and improved method of making a fluid sealing gasket assembly by utilizing the backbone and its tabs which are reversely bent as set forth above for hole alignment and to provide crush limiting construction. The gasket material, rubber or thermoplastic elastomer is then molded or otherwise formed around the backbone.

These and other features, objects and advantages of this invention will become more apparent from the following detailed description and drawing in which:

BRIEF DESCRIPTION OF THE DRAWINGS

FIG. 3 is a cross-sectional view of the gasket core taken along sight lines 3—3 of FIG. 1;

FIG. 4 is a cross-sectional view of the gasket assembly taken along sight lines 4—4 of FIG. 2;

FIG. 5 is a cross-sectional view of the gasket assembly taken along sight lines 5—5 of FIG. 2;

FIG. 5A is an enlarged view of gasket cross-section of FIG. 5.

FIG. 6 is a view partly in cross-section taken generally along sight lines 6—6 of FIG. 2 showing a portion of a valve cover secured to an engine cylinder head with the gasket assembly secured therebetween; and FIG. 7 is a view partly in cross-section taken generally along sight lines 7—7 of FIG. 2.

FIG. 8 is a view of the gasket taken along sight lines 8—8 of FIG. 2.

FIG. 9 is a view of the gasket taken along sight lines 9—9 of FIG. 2.

DESCRIPTION OF THE PREFERRED EMBODIMENTS

Figure 1:
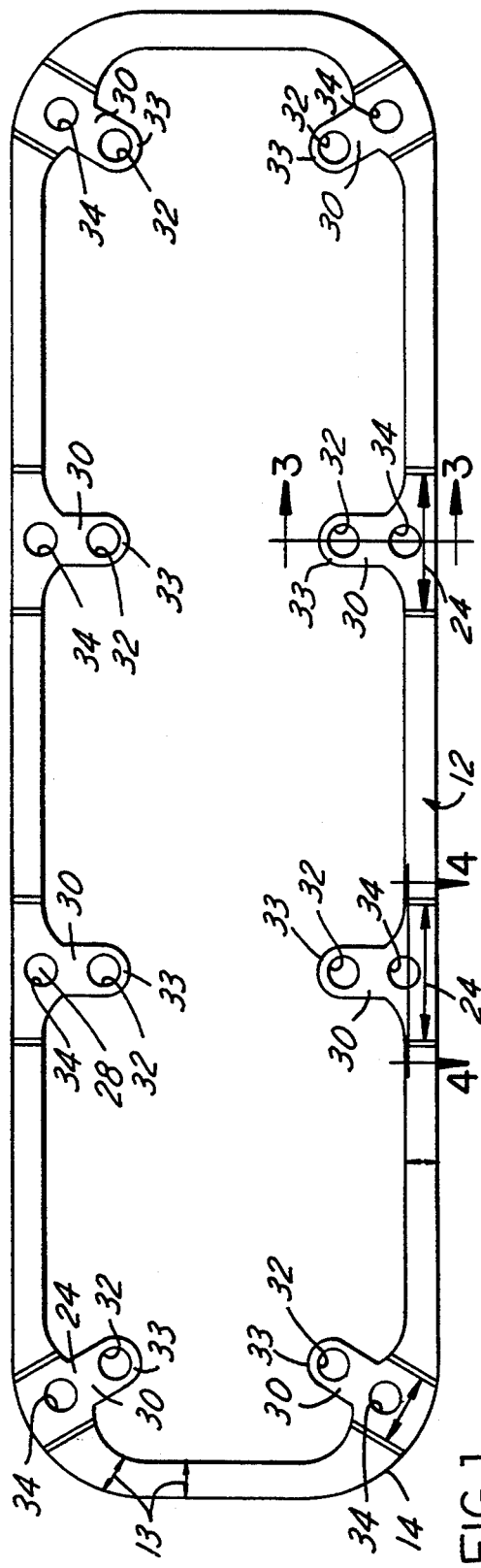
FIG. 1 is a top view of the backbone of the gasket assembly of one embodiment of this invention as stamped, or otherwise formed, from sheet metal stock.
Figure 2:
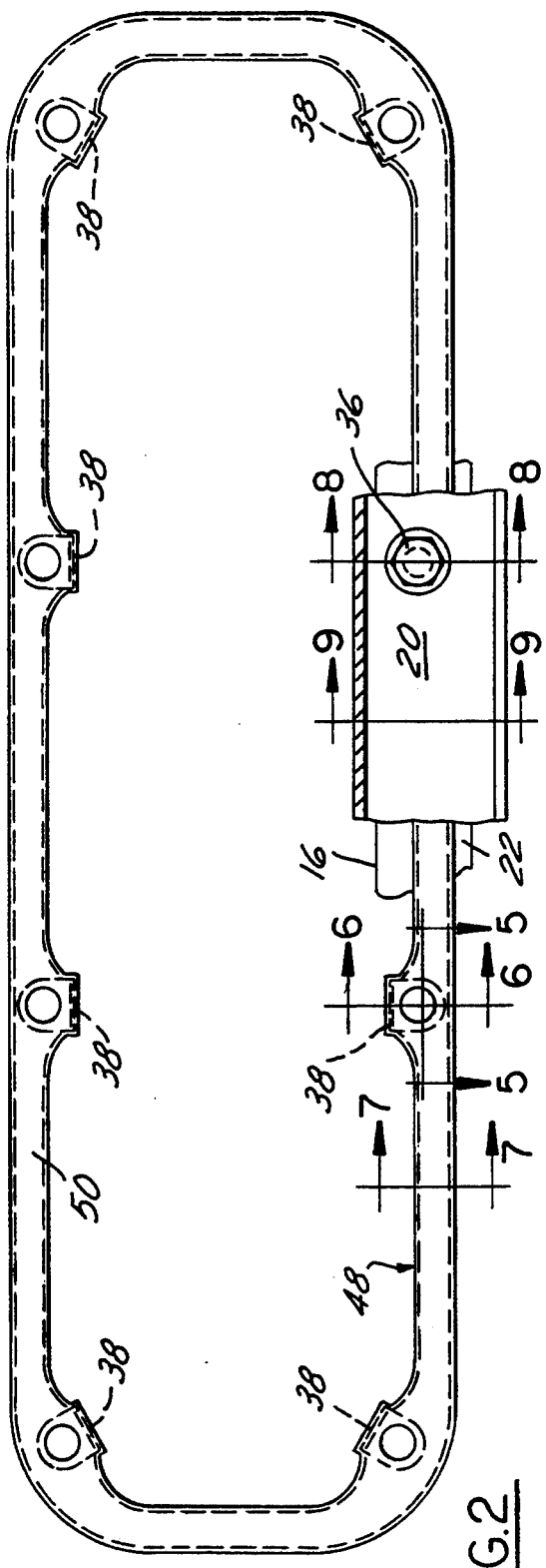
FIG. 2 is a top view of the gasket assembly of this invention, as installed between a cover plate and cylinder head partially shown, having portions of the core bent to overlay the main body thereof and covered with a rubber sealing compound.

Turning now in greater detail to the drawings, there is shown in FIG. 1 a gasket backbone 10 blanked from a sheet of steel, or other suitable material, of a predetermined thickness range. The backbone has a generally rectangular and flattened main body 12 with top and bottom sides and has a range of widths 13 and rounded corners 14 and defines an inner opening 16 that corresponds to the opening between a cover 20 and cylinder head 22 of an internal combustion engine.

Spaced portions or stations 24 of the main body 12 of the backbone are however offset from the horizontal plane of the main body 12 by a measure approximately equal to the thickness of the main body so that when the backbone is covered with a sealant material, the resulting gasket assembly will have a constant thickness throughout its extent as will be further described.

Extending in the same plane as the offset portions 24 and along linear axes 26, radiating from predetermined center points 28 in the offsets 24 of the main body are a plurality of spaced tabs 30 that are stamped, or otherwise formed, as integral parts of the backbone 10. The tabs are finger-like projections that project into the opening 16 and have circular holes 32 punched in the distal end portions 33 thereof.

In the backbone blank of FIG. 1, each of the holes 32 is in radial alignment with corresponding circular holes 34 punched at center points 28 through the offset portions of main body 12 to have a diameter corresponding to the diameter of holes 34 and sized to fit the threaded fasteners here provided by cap screws 36.

With this backbone construction, the tabs 30 can be reversely bent at 38 back upon the offset portions 24 of the main body 12 so that the distal end 33 of each tab overlies and interfaces with and preferably physically contacts the upper surface of the offset portions 24 of the main body so that the holes 32 in the tabs overlies and aligns with the corresponding holes 34 in the main body. Importantly, the reversely bent tabs and the main body have a combined thickness to provide stops that limit the compression loads that may be diverted onto a gasket assembly 48 formed by the backbone 10 with a rubber compound or thermoplastic material 50 molded thereon.

With the sealing material completely encasing the backbone, an elastic seal is provided for filling in any irregularities in the facing surfaces 52, 54 of the valve cover 20 and cylinder head 22. While the thickness of the rubber compound or other sealing material varies, as shown in cross-sections of FIGS. 4 and 5, the overall thickness of the gasket assembly 48 is constant, and importantly, the double thickness provided by the reversely bent tabs 30 and the offset portion 24 forms an integral stop for threaded fasteners.

This is best shown in FIGS. 6 and 7, wherein the threaded fasteners provided by cap screws 36 have been torqued to a positive stop point in FIG. 6 as provided by the doubled thickness of the tabs and offset portions of the main body to limit the compression stressing of the gasket, and particularly, the stressing of the rubber compound seal so that the bulk modules or cold flow of the rubber compound out of sealing engagement with the interfacing surfaces 52, 54 is limited. With the integral compression limiting stops, the cap screws can be installed quickly into the aligned openings provided in the cover 20, cover gasket 48 and cylinder head 22 with assurance that the compression loading of the gasket is limited by the built-in stops and the gasket. This predetermined and limited compression effectively seals the cover to the cylinder head without excessive cold flow, splitting, or otherwise, damaging the gasket.

The finished gasket assembly is a unified component preferably with all edges and surfaces covered to facilitate handling. The fastener holes being of double thickness of backbone metal provides better support and alignment for the fasteners and ensures that the fastener is installed without cross threading and that the gasket is installed with constant compression loads all around the perimeter of the opening for long service life.

While a preferred embodiment of the invention has been shown and described, other embodiments will now become apparent to those skilled in the art. Accordingly, this invention is not to be limited to that which is shown and described but by the following claims.

What is claimed is:

1. A method of making a gasket assembly for the sealing of the opening provided by the interface of mating parts when under compression loads by threaded fasteners connecting the mating parts comprising the steps of:
    a. making a backbone of sheet metal to form a main body that fits around the opening defined by said interface,
    b. offsetting a portion of said main body at predetermined stations to simultaneously form finger-like tabs which project from alignment with predetermined positions from the main body of said core,
    c. forming openings for threaded fasteners at said predetermined positions in said main body of said backbone,
    d. forming openings in an end portion of each of said finger-like tabs aligned with associated openings in said backbone sized to receive said threaded fasteners,
    e. reversely bending said tabs so that the end portions thereof overlay the offset portions of the main body with the opening in each said tab aligned with the associated opening in each said main body to form openings for threaded fasteners and to establish a stop for limiting the compression loads of the threaded fasteners when said gasket is operatively installed between said interfacing surfaces of said mating parts,
    f. completely covering the backbone with a rubber-like material so that said material will effectively seal against the interfaces of said mating parts when said parts are interconnected by said threaded fasteners exerting said limited compression loads on said gasket.

* * * * *